No. 688,687. Patented Dec. 10, 1901.
C. J. PRINTZ.
MEANS FOR FASTENING ARMS, LEVERS, OR PULLEYS TO SHAFTS OR STEMS.
(Application filed Feb. 13, 1901.)
(No Model.)
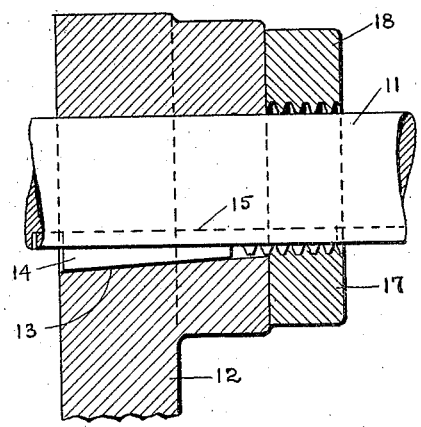
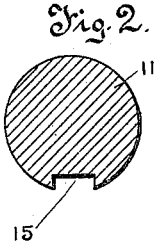
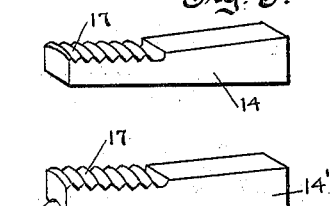
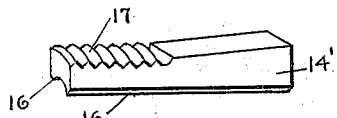
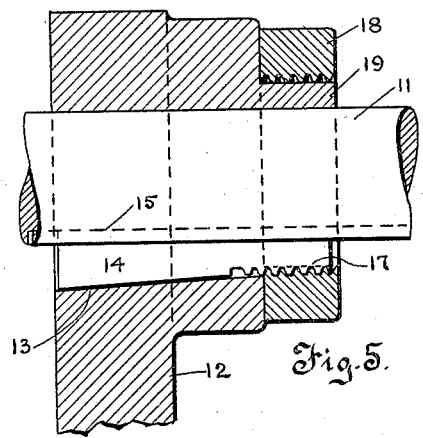
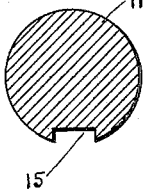
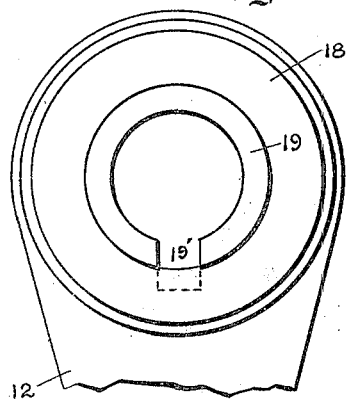
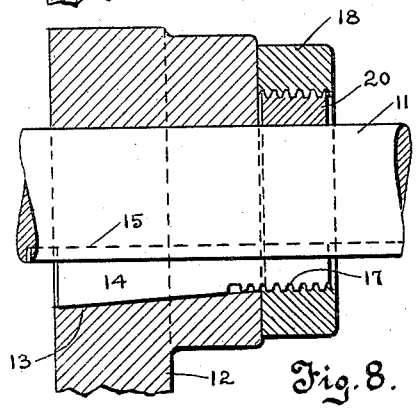
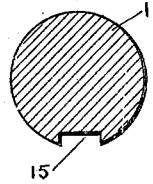
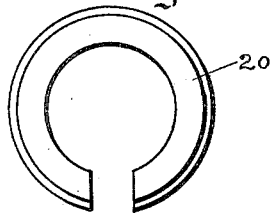
Witnesses
Inventor.
Carl J. Printz
By Benedict & Morsell
Attorneys.

UNITED STATES PATENT OFFICE.

CARL J. PRINTZ, OF MILWAUKEE, WISCONSIN.

MEANS FOR FASTENING ARMS, LEVERS, OR PULLEYS TO SHAFTS OR STEMS.

SPECIFICATION forming part of Letters Patent No. 688,687, dated December 10, 1901.

Application filed February 13, 1901. Serial No. 47,104. (No model.)

*To all whom it may concern:*

Be it known that I, CARL J. PRINTZ, residing in Milwaukee, in the county of Milwaukee and State of Wisconsin, have invented a new and useful Improvement in Means for Fastening Arms, Levers, or Pulleys to Shafts or Stems, of which the following is a description, reference being had to the accompanying drawings, which are a part of this specification.

My invention has relation to improvements in means for fastening arms, levers, or pulleys to shafts or stems.

The invention has for its object the production of a strong and simple device for fastening arms, levers, or pulleys to oscillating or revolving shafts or stems; and with this primary object in view the invention consists of the devices and parts or their equivalents, as hereinafter more fully set forth.

In the accompanying drawings, Figure 1 is a sectional side view through the center of the arm, lever, or pulley, showing the same connected to a shaft or stem by means of my device. Fig. 2 is a transverse section through the shaft in order to illustrate the key-seat. Fig. 3 is a detail view of the key. Fig. 4 is a detail view of the modified form of key. Fig. 5 is a similar view to Fig. 1 of a modified form of construction. Fig. 6 is a transverse section through the shaft illustrated in Fig. 5. Fig. 7 is an end view of Fig. 5 with the key omitted. Fig. 8 is a similar view to Figs. 1 and 5 of still another modified form of construction. Fig. 9 is a transverse section through the shaft shown in Fig. 8, and Fig. 10 is a detail view of the follower.

Referring to the drawings, the numeral 11 throughout the several views indicates a shaft or stem, and 12 the arm, lever, or pulley secured thereto. The opening of the arm, lever, or pulley through which the shaft or stem passes is provided with a wedge-shaped key-seat 13, which receives the tapered or inclined face of a wedge-key 14. I prefer that the opposite straight face of the key be fitted in a recess 15, forming a key-seat in the shaft or stem. In all the several forms of construction illustrated one end of the key projects outwardly beyond one side of the arm, lever, or pulley, and the outer face of this projecting portion is provided with a series of teeth 17.

In Fig. 1 a nut 18 is shown as surrounding the shaft 11 and has threaded contact with the projecting threaded end of the key. By the turning of this nut in the proper direction the key of course is drawn into tight wedging engagement with the key-seat 13, being permitted to slide in the key-seat 15.

In the modified form of construction illustrated in Figs. 5 and 7 the hub of the arm, lever, or pulley is provided with an integral extension 19, having a space 19' therethrough for the accommodation of the projecting threaded portion of the key, so that the threads may be exposed, and thereby adapted to be engaged by the nut. Surrounding this extension is the nut 18. By providing this extension 19 I am enabled to make the projecting threaded portion of the key 14 considerably thicker than in the form shown in Fig. 1, and hence strength is thereby subserved. If desired, in the Figs. 5 and 7 form of construction the necessity for forming a key-seat in the shaft may be avoided by adopting the form of key illustrated in Fig. 4 of the drawings and designated by the numeral 14', said key having its straight face provided with projecting knife-edges 16 16, which engage the surface of the shaft.

In the modified form illustrated in Fig. 8 the integral extension 19 is omitted and in lieu thereof a follower 20 is provided. This follower consists of a split exteriorly-threaded ring or annulus fitting the shaft. The nut 18 is in threaded contact with the follower and key, and hence when turned will draw the key into tight wedging engagement with the arm, lever, or pulley. The split portion of the ring is for the accommodation of the projecting end of the key, the threads of said projecting end being thereby also permitted to be engaged by the nut. By this modified form of construction the projecting end of the key is also permitted to be made of considerable thickness, the same as in the Fig. 5 form; but the necessity of providing the arm, lever, or pulley with an integral extension 19 is avoided.

It will be understood that if hammer motion, or, in other words, a sudden-stop motion, is desired the thread may be right or left hand, as the case may be, in order to make the nut self-tightening.

From the above description it will be seen that I provide a simple and inexpensive device for the purpose intended, capable of effecting a most secure and effective fastening of an arm, lever, or pulley to a shaft or stem.

Considerable trouble has heretofore been experienced in devising a suitable means for securely fastening the so-called "steam-arm" in Corliss engines, or the arm or lever which is fastened to the stem driving the steam or inlet valve on a Corliss steam-engine. It will be found that my invention may be used to special advantage in this connection.

What I claim as my invention is—

1. In a fastening device, the combination of a shaft, a device to be fastened mounted on the shaft, a key fitting between the shaft and the device to be fastened in a suitable key-seat therefor, said key having a projecting threaded end, said projecting threaded end being substantially flat, in cross-section, and a nut concentrically surrounding the shaft, and receiving therein the threaded projection of the key, the nut being in threaded engagement with the threaded projection of the key.

2. In a fastening device, the combination of a shaft, a device to be fastened mounted on the shaft, a tapering key fitting between the shaft and the device to be fastened, in a suitable key-seat therefor said key having a projecting threaded end, said projecting threaded end being substantially flat, in cross-section, and a nut concentrically surrounding the shaft, and receiving therein the threaded projection of the key, the nut being in threaded engagement with the threaded projection.

3. In a fastening device, the combination of a shaft, a device to be fastened mounted on the shaft, a key fitting between the shaft and the device to be fastened, in a suitable key-seat therefor, said key having one end threaded, a nut engaging the threads of the end of the key, and a part interposed between said nut and the shaft.

4. In a fastening device, the combination of a shaft, a device to be fastened mounted on the shaft, a key fitting between the shaft and the device to be fastened in a suitable key-seat therefor, said key having one end threaded, a follower surrounding the shaft, and consisting of a split ring, the split portion thereof receiving therein the threaded end of the key, and a nut surrounding the follower and engaging the threads of the key.

5. In a fastening device, the combination of a shaft, a device to be fastened mounted on the shaft, a key fitting between the shaft and the device to be fastened, in a suitable key-seat therefor, said key having one end threaded, a follower surrounding the shaft, and consisting of an exteriorly-threaded split ring, the split portion thereof receiving therein the threaded end of the key, and a nut engaging the threads of the follower and of the key.

In testimony whereof I affix my signature in presence of two witnesses.

CARL J. PRINTZ.

Witnesses:
  A. L. MORSELL,
  ANNA V. FAUST.